US 6,986,417 B2

(12) United States Patent
Nishizawa et al.

(10) Patent No.: US 6,986,417 B2
(45) Date of Patent: Jan. 17, 2006

(54) TRANSFER SYSTEM

(75) Inventors: Yoshihiro Nishizawa, Saitama (JP); Masami Mitsuhashi, Saitama (JP); Keiichi Kubota, Saitama (JP); Kouichi Ikeda, Saitama (JP); Hideo Murakami, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/661,507

(22) Filed: Sep. 15, 2003

(65) Prior Publication Data

US 2004/0134756 A1 Jul. 15, 2004

Related U.S. Application Data

(63) Continuation-in-part of application No. 09/807,988, filed as application No. PCT/JP99/06130 on Nov. 4, 1999, now Pat. No. 6,626,282.

(30) Foreign Application Priority Data

| Nov. 4, 1998 | (JP) | ................................. 10-313524 |
| Nov. 30, 1998 | (JP) | ................................. 10-340550 |

(51) Int. Cl.
*B65G 47/10* (2006.01)

(52) U.S. Cl. .................................. 198/370.01; 414/285

(58) Field of Classification Search .......... 198/370.01; 414/285

See application file for complete search history.

(56) References Cited

U.S. PATENT DOCUMENTS

| 4,307,988 A | * | 12/1981 | Page et al. .................. 414/276 |
| 5,012,917 A |   | 5/1991  | Gilbert et al. ........... 198/465.2 |
| 5,125,782 A | * | 6/1992  | Goldschmidt et al. ...... 414/276 |
| 5,271,490 A |   | 12/1993 | Sticht ..................... 198/465.2 |
| 5,468,110 A | * | 11/1995 | McDonald et al. ......... 414/273 |
| 5,593,018 A | * | 1/1997  | Gosdowski et al. ..... 198/370.1 |
| 6,139,240 A | * | 10/2000 | Ando ......................... 414/267 |
| 6,629,592 B2 | * | 10/2003 | Bernard et al. ............. 198/360 |

FOREIGN PATENT DOCUMENTS

| JP | A-61-81320  | 4/1988  |
| JP | B2-4-57555  | 9/1992  |
| JP | A-4-306162  | 10/1992 |
| JP | 58-71049    | 4/1993  |
| JP | A-8-215944  | 8/1996  |
| JP | A-10-166230 | 6/1998  |
| JP | A-10-217047 | 8/1998  |
| RU | 1351749     | 11/1987 |

\* cited by examiner

Primary Examiner—Joe Dillon, Jr.
(74) Attorney, Agent, or Firm—Arent Fox PLLC

(57) ABSTRACT

A transfer system includes transfer lines (L) each of which forms a closed loop and has transfer-in stations ($S_1$ and $S_3$) and transfer-out stations ($S_2$ and $S_4$) for assembling parts to a work, while circulating the work along the transfer line (L); and a work and part transfer passage (51) for transferring the work and the parts. Transfer-in stations ($S_1$ and $S_3$) and the transfer-out stations ($S_2$ and $S_4$) are disposed at each of the longitudinal ends of each of the transfer lines (L). Sub-transfer-passages ($52_1$ and $52_2$) branching out rightward and leftward from the work and part transfer passage (51), are disposed along longitudinal sides of the transfer lines (L). With this layout, a plurality of the transfer lines (L) can be disposed in a required minimum space, while securing a smooth supply and discharge of the works and parts with respect to the plurality of the transfer lines L.

4 Claims, 9 Drawing Sheets

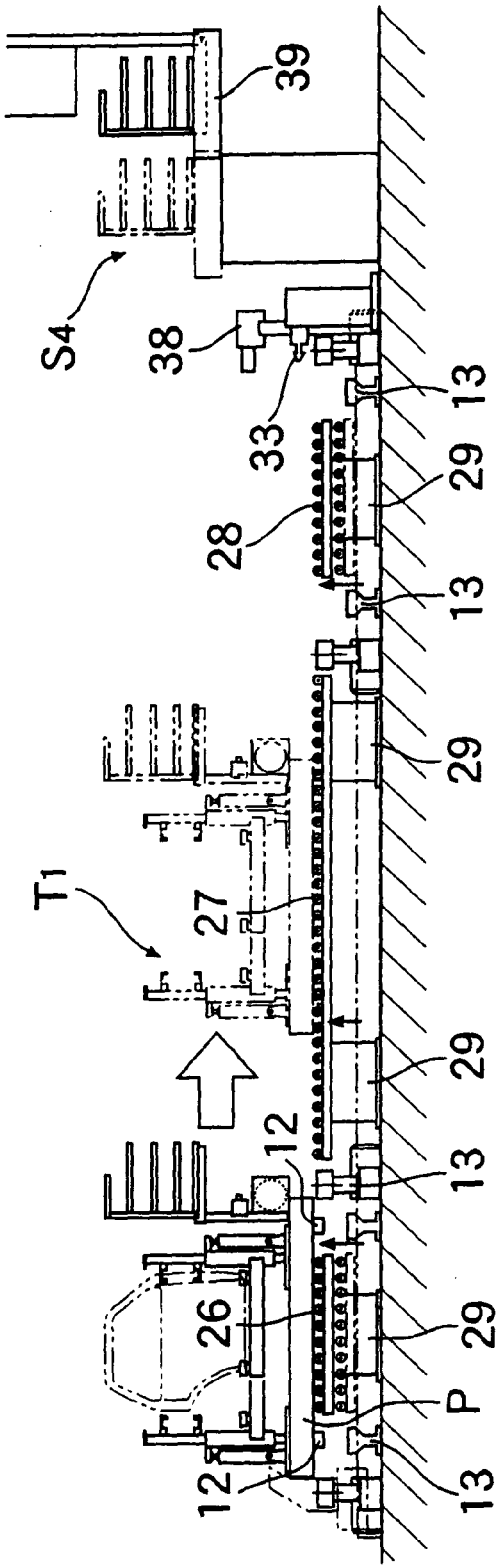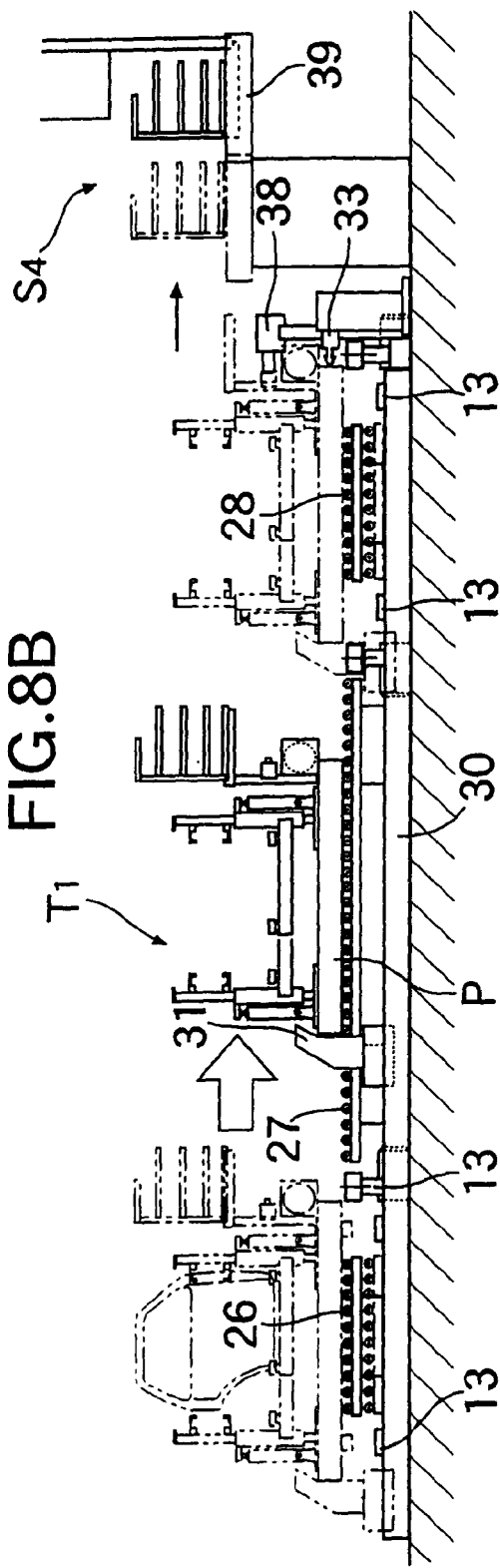

TRANSFER SYSTEM

This is a Continuation-in-Part of application Ser. No. 09/807,988 filed Aug. 10, 2001 U.S. Pat. No. 6,626,282. The disclosure of the prior application(s) is hereby incorporated by reference herein in its entirety. This application is a 371 and claims the priority of foreign application No. PCT/JP99/06130 filed Nov. 4, 1999 in Europe, Application No. 10-313524 filed Nov. 4, 1998 in Japan and application Ser. No. 10-340550 filed Nov. 30, 1998 in Japan are claimed under 35 U.S.C. §119 and/or §365(b).

FIELD OF THE INVENTION

The present invention relates to a transfer system for carrying out the assembling of parts to a work, while circulating the work along a transfer line forming a closed loop.

BACKGROUND ART

Such a transfer system for carrying out the assembling of parts, while circulating a pallet with a work placed thereon along a transfer line forming a closed loop is conventionally known (see Japanese Patent Publication No. 4-57555). In the above known transfer system, a pallet-shaped carriage on which a work can be placed is circulated on rails placed along a quadrilateral transfer line. In this case, the carriage is allowed to travel by connecting and disconnecting an endless chain, circulatively driven along the rails by a drive source, to or from the carriage, or the carriage is allowed to travel pitch by pitch by bringing the carriage into and out of engagement with a rack which is reciprocally driven through a predetermined distance along the rails by a drive source, and during this time, the assembling of parts to the work placed on the carriage is carried out.

However, since it is necessary to supply parts to be assembled to a work from the outside, to the carriage in succession, the above known system suffers from a problem that, when a plurality of transfer lines are additionally provided in the system, it is difficult to secure a space for smoothly supplying the parts to these transfer lines and to enhance the working efficiency.

DISCLOSURE OF THE INVENTION

The present invention has been accomplished in view of the above circumstances, and it is an object of the present invention to provide a transfer system for assembling parts to a work while circulating the work along a plurality of transfer lines each forming a close loop, in which the transfer lines can be disposed in a required minimum space while securing smooth supply and discharge of the works and parts with respect to the transfer lines.

To achieve the object, according to a first feature of the present invention, there is provided a transfer system comprising transfer lines each of which forms a closed loop and has transfer-in stations and transfer-out stations for assembling parts to a work, while circulating the work along the transfer line; a work and part transfer passage for transferring the work and the parts; and sub-transfer-passages branching out from the work and part transfer passage; wherein longitudinal ends of each of the transfer lines face a side of the work and part transfer passage; wherein the transfer-in stations and the transfer-out stations are disposed at each of the longitudinal ends of each of the transfer lines; and wherein the sub-transfer-passages are disposed on longitudinally sides of the transfer lines.

With the above arrangement, the longitudinal ends of each of the plural transfer lines face a side of the work and part transfer passage, and the transfer-in stations and the transfer-out stations are disposed at each of the longitudinal ends of each of the transfer lines. Therefore, the plurality of the transfer lines can be compactly disposed in a required minimum space while facilitating smooth supply and discharge of the works and parts, from the common work and part transfer passage, with respect to the plurality of the transfer lines. Further, the sub-transfer-passages branching out from the work and part transfer passage are disposed on longitudinally sides of the transfer lines. Therefore, it is possible to easily supply the parts to the intermediate portions of the transfer lines.

According to a second feature of the present invention, in addition to the first feature, there is provided a transfer system wherein longitudinal ends of a pair of the transfer lines face opposite sides of the work and part transfer passage.

With the above arrangement, since the longitudinal ends of the pair of the transfer lines face opposite sides of the work and part transfer passage, it is possible to effectively utilize a narrow long space to compactly dispose therein the pair of the transfer lines.

According to a third feature of the present invention, in addition to the second feature, there is provided a transfer system, wherein transfer directions of the pair of the transfer lines disposed on the opposite sides of the work and part transfer passage are reverse to each other, the transfer-in stations of one transfer line oppose to the same of the other transfer line, with the work and part transfer passage therebetween; and the transfer-out stations of one transfer line oppose to the same of the other transfer line, with the work and part transfer passage therebetween.

With the above arrangement, the transfer directions of the pair of the transfer lines disposed on the opposite sides of the work and part transfer passage are reverse to each other, the transfer-in stations of one transfer line oppose to the same of the other transfer line, with the work and part transfer passage therebetween; and the transfer-out stations of one transfer line oppose to the same of the other transfer line, with the work and part transfer passage therebetween. Therefore, it is possible to further smoothly perform the supply and discharge between the work and part transfer passage and the transfer lines.

According to a fourth feature of the present invention, in addition to the first feature, there is provided a transfer system, wherein a pair of the transfer lines are disposed along one side of the sub-transfer-passages, and another pair of the transfer lines are disposed along the other side of the sub-transfer-passages.

With the above arrangement, since the pair of the transfer lines are disposed along one side of the sub-transfer-passages, and another pair of the transfer lines are disposed along the other side of the sub-transfer-passages, it is possible to smoothly perform the supply and discharge between the work and part transfer passage and the total four transfer lines while compactly disposing the four transfer lines.

BRIEF DESCRIPTION OF THE DRAWINGS

FIGS. 1 to 9 show one embodiment of the present invention, wherein FIG. 1 is a plan view of a sub-line for sub-assembling a door of an automobile; FIG. 2 is a sectional view taken along a line 2—2 in FIG. 1; FIG. 3 is a view taken along a line 3—3 in FIG. 1; FIG. 4 is a sectional view taken along a line 4—4 in FIG. 1; FIG. 5 is an enlarged view of a portion indicated by 5 in FIG. 1; FIG. 6 is a view taken in the direction of an arrow 6 in FIG. 5; FIG. 7 is a view taken in the direction of an arrow 7 in FIG. 5; and FIGS. 8A and 8B are views for explaining the operation of a traverser. FIG. 9 is a view showing a combination of four sub-lines for sub-assembling a rear door, a tail gate, a front door and a bonnet hood.

BEST MODE FOR CARRYING OUT THE INVENTION

Figure 1:
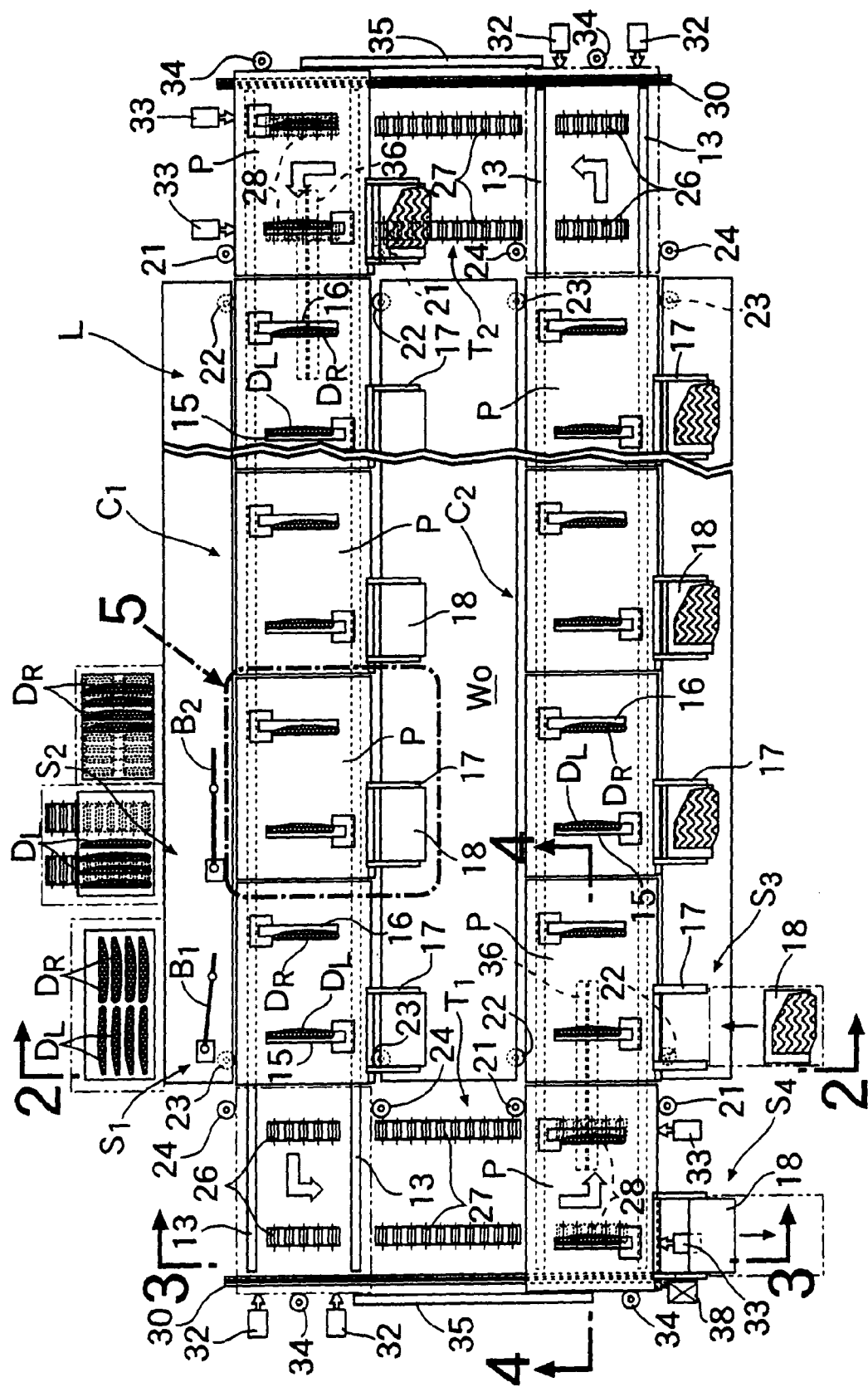

As shown in FIG. 1, a transfer system of this embodiment is utilized in a sub-line provided sideways of a main line for assembling an automobile, and is operable to assemble parts by an operator riding on a pallet P, while circulating left and right rear doors $D_L$ and $D_R$ as works removed from a vehicle body of an automobile flowing in a main line on a closed transfer line L in a state in which they have been placed on the pallet P. The left and right rear doors $D_L$ and $D_R$ having the parts assembled thereto are returned to the main line where they are attached again to the vehicle body of the automobile.

The transfer line L in the transfer system is comprised of a first conveyer $C_1$ and a second conveyer $C_2$ disposed in parallel to each other, a first traverser $T_1$ extending from a terminal end of the first conveyer $C_1$ toward a start end of the second conveyer $C_2$, and a second traverser $T_2$ extending from a terminal end of the second conveyer $C_2$ toward a start end of the first conveyer $C_1$. The entire transfer line L is formed into a rectangular shape having long sides along transferring directions of the first and second conveyers $C_1$ and $C_2$ and short sides along transferring directions of the first and second traversers $T_1$ and $T_2$.

A work transfer-in station $S_1$ and a work transfer-out station $S_2$ are disposed adjacent each other sideways of the first conveyer $C_1$. The doors $D_L$ and $D_R$ transferred from the main line by a carriage (not shown) are temporarily stored in the work transfer-in station $S_1$, and a pair of the left and right doors $D_L$ and $D_R$ are sequentially transported from the work transfer-in station $S_1$ onto each of the pallets P of the transfer system at a transporting device $B_1$. The pallet P which has received the pair of the left and right doors $D_L$ and $D_R$ in the work transfer-in station $S_1$ is circulated from the terminal end of the first conveyer $C_1$ on the first traverser $T_1$, the second conveyer $C_2$, the second traverser $T_2$ and the first conveyer $C_1$. When the doors $D_L$ and $D_R$ to which the parts have been attached during this time reach the work transfer-out station $S_2$, they are expelled from the pallet P by a transporting device $B_2$. A predetermined numbers of the doors $D_L$ and $D_R$ are placed onto the carriage and returned to the main line.

Figure 5:
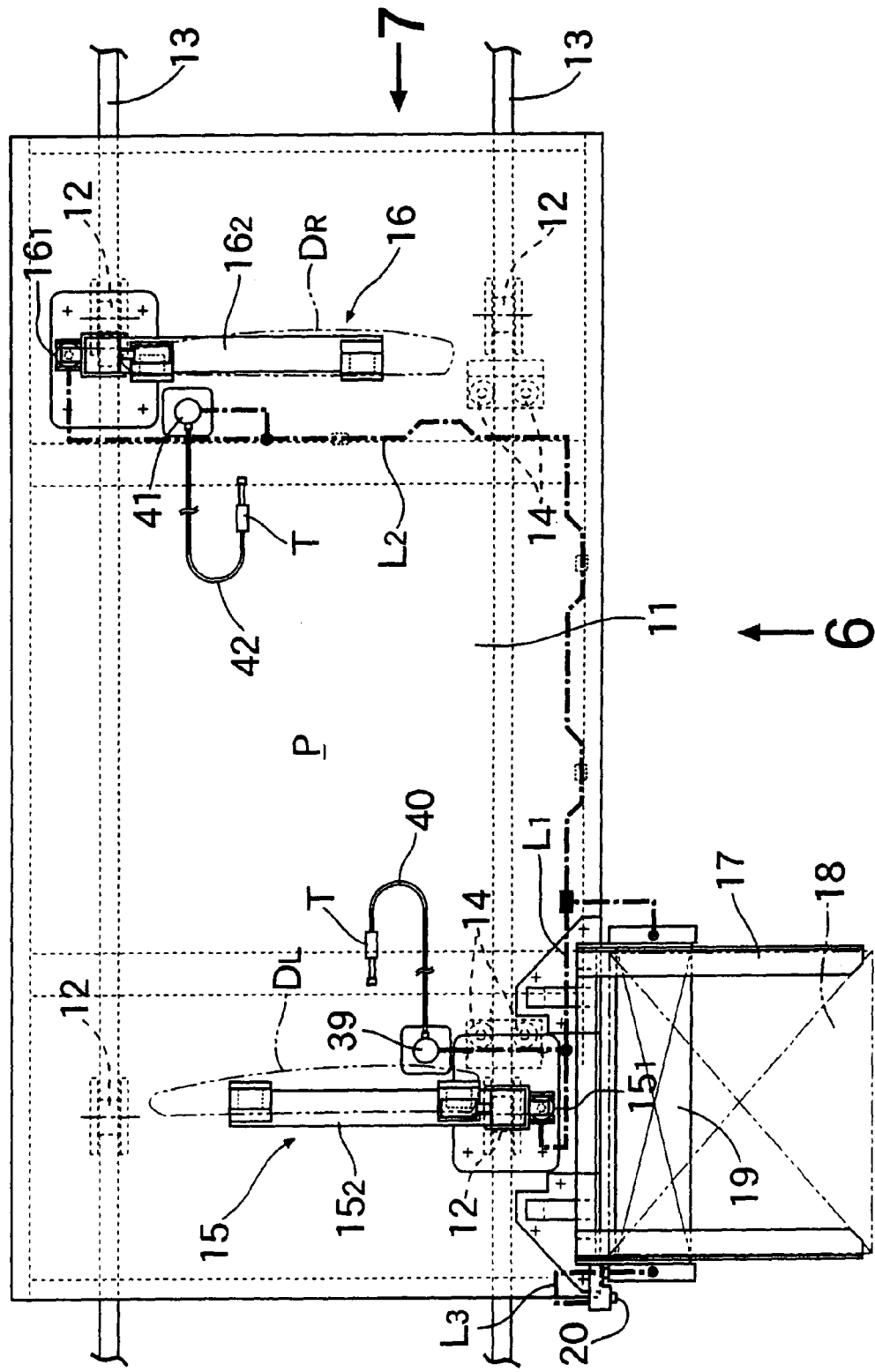
Figure 6:
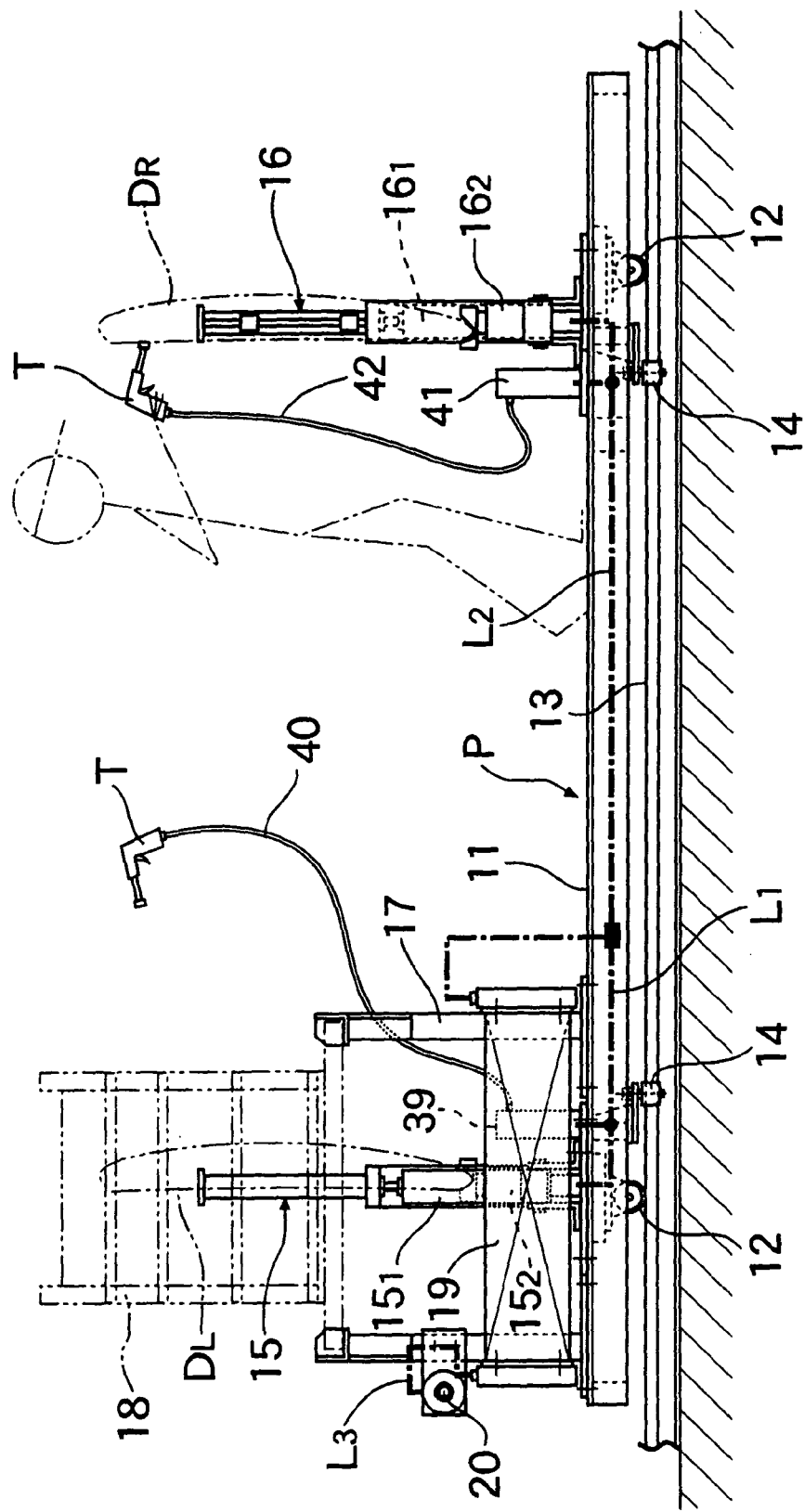
Figure 7:
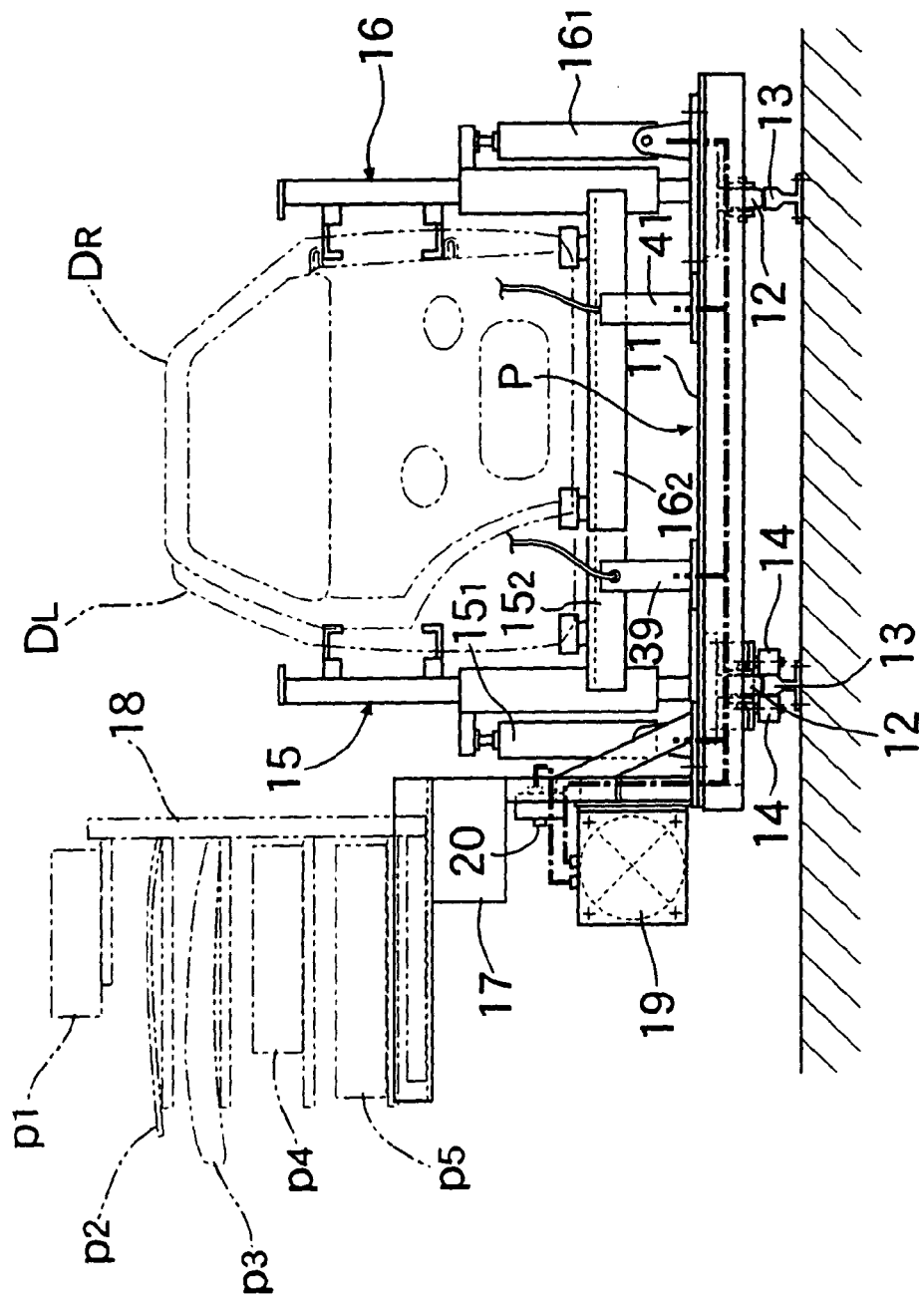

The structure of the pallet P will be described with reference to FIGS. 5 to 7.

The pallet P includes a base plate 11 formed into a quadrilateral plate-shape, and four casters 12 are mounted on a lower surface of the base plate 11. Each of the first and second conveyers $C_1$ and $C_2$ has a pair of rails 13, 13, so that the four casters 12 are guided on the rails 13, 13. A pair of guide rollers 14, 14 are respectively provided in the vicinity of the two casters 12, 12 on laterally one side of the pallet P, so that the casters 12 is prevented from being derailed from the rails 13, 13 by rolling of the guide rollers 14, 14 along opposite side surfaces of either one of the rails 13.

Two door supporting jigs 15 and 16 forming work supporting jigs of the present invention are raised on an upper surface of the pallet P. The left door $D_L$ is supported in a righted attitude on a support arm $15_2$ which is provided on one of the door supporting jigs 15 and lifted and lowered by an air cylinder $15_1$, and the right door $D_R$ is supported in a righted attitude on a support arm $16_2$ which is provided on the other door supporting jig 16 and lifted and lowered by an air cylinder $16_1$. A tray support 17 forming a part support of the present invention is provided at laterally one side of the pallet P to protrude in a lateral direction, so that a multi-stage part tray 18, on which parts $p_1$ to $p_5$ (a window glass, an inner panel, a small-size part and the like) to be assembled to each of the doors $D_L$ and $D_R$ placed on the pallet P have previously been set, can be placed on the tray support 17.

An air tank 19 filled with air is mounted on the pallet P, so that air for driving the air cylinders $15_1$ and $16_1$ and air for driving an air tool T such as an impact wrench for assisting in the assembling of the parts $p_1$ to $p_5$ on the pallet P are supplied from the air tank 19. More specifically, a piping $L_1$ extending from the air tank 19 is connected to the air cylinder $15_1$ of the door support jig 15 for the left door $D_L$ and to an air tool connection 39 provided in the vicinity of the air cylinder $15_1$, and the air tool T is releasably connected to the air tool connection 39 through an air hose 40. Likewise, a piping $L_2$ extending from the air tank 19 is connected to the air cylinder $16_1$ of the door support jig 16 for the right door $D_R$ and to an air tool connection 41 provided in the vicinity of the air cylinder $16_1$, and the air tool T is releasably connected to the air tool connection 41 through an air hose 42.

A coupling 20 and a piping $L_3$ for supplementing air to the air tank 19 from the outside are mounted on the tray support 17 of the pallet P.

Figure 2:
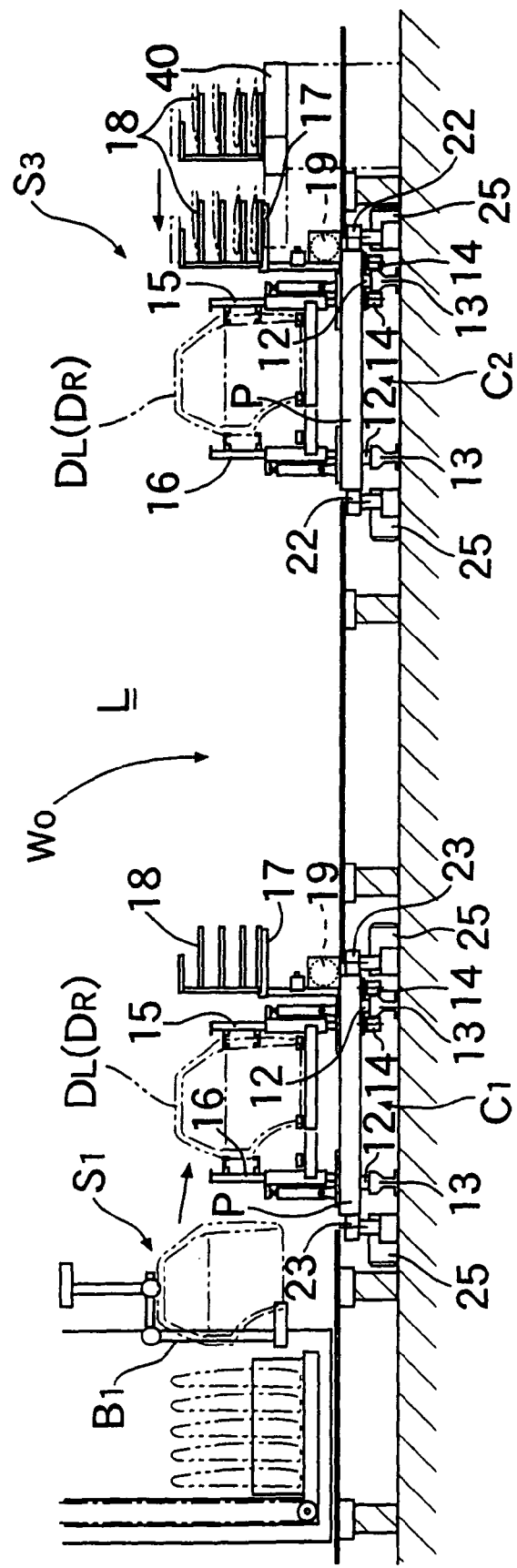
Figure 4:
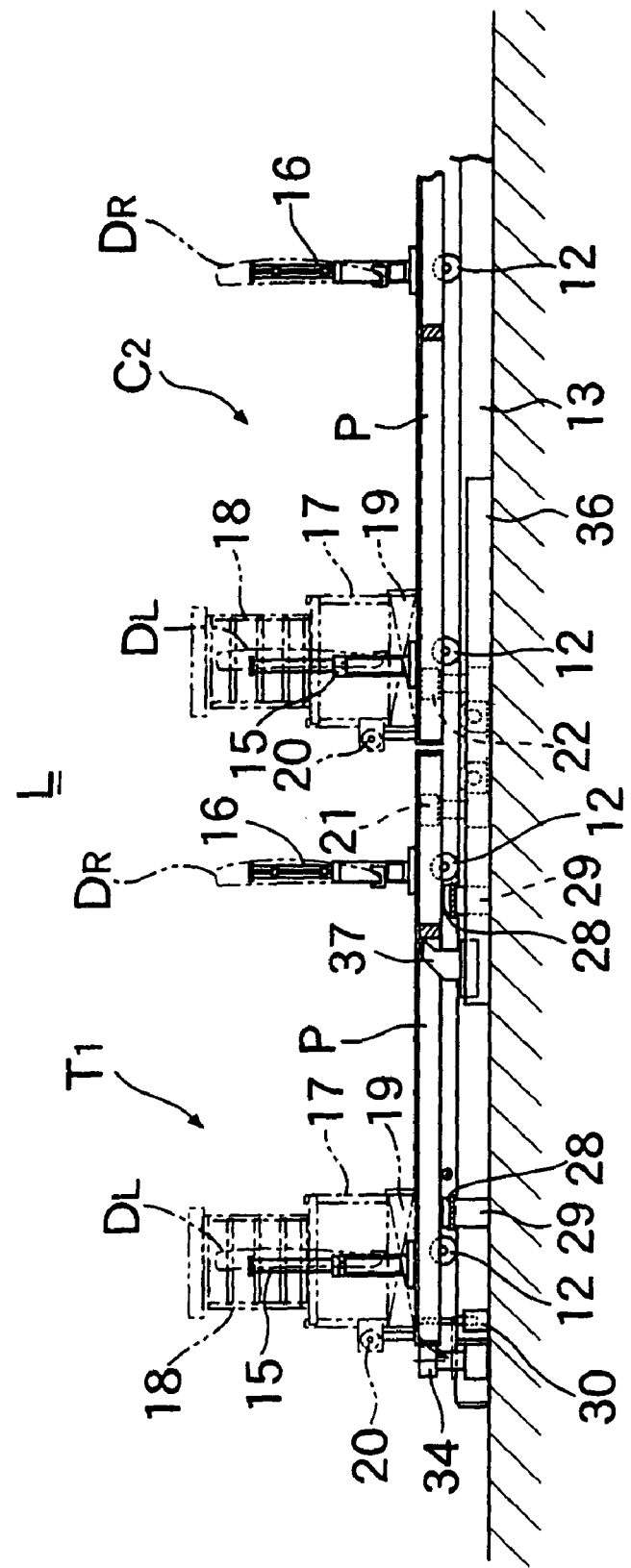

The structures of the first and second conveyers $C_1$ and $C_2$ will be described below with reference to FIGS. 1, 2 and 4. The first and second conveyers $C_1$ and $C_2$ are disposed point-symmetrical with respect to the center of the transfer system and have substantially the same structure and hence, the structure of the first conveyer $C_1$ will be described below as a representative.

The first conveyer $C_1$ includes the pair of left and right rails 13, 13 for guiding the four casters 12 of the pallet P, and opposite ends of the rails 13, 13 extend within the first and second traversers $T_1$ and $T_2$. A pair of left and right transfer-in drive rollers 21, 21 and a pair of main drive rollers 22, 22 are mounted at the start end of the first conveyer $C_1$, and a pair of left and right brake rollers 23, 23 and a pair of left and right transfer-out drive rollers 24, 24 are mounted at the terminal end of the first conveyer $C_1$. Each of the rollers 21, 21; 22, 22; 23, 23; and 24, 24 forming friction rollers of the present invention is formed of a elastic material such as a rubber, and driven by a motor 25 mounted at a lower portion thereof to abut against the left and right long sides of the pallet P to generate a driving force or a braking force. The pallets P are moved by abutment of the rollers 21, 21; 22, 22; 23, 23; and 24, 24 formed of such an elastic material and hence, the structure of the drive system for the first and second conveyers $C_1$ and $C_2$ can be extremely simplified, and also the generation of a vibration and a noise can be maintained to the minimum to drive the pallets P smoothly.

A plurality of the pallets P are disposed without gaps on the first conveyer $C_1$, and the main drive rollers 22, 22 urge the plurality of pallets P laying on the first conveyer $C_1$ from the rear to move them simultaneously by continuously driving one pallet P located at the start end of the first conveyer $C_1$ at a low speed. The brake rollers 23, 23 apply a braking force to one of the plurality of pallets P moved by the main drive rollers 22, 22, which is located at the terminal end of the first conveyer $C_1$, thereby preventing the pallet P from overrunning onto the first traverser $T_1$. The transfer-out drive rollers 24, 24 are driven at a speed higher than that of the main drive rollers 22, 22, when one pallet P located at the terminal end of the first conveyer $C_1$ is to be separated from the succeeding pallet P and moved to the start end of the first traverser $T_1$. The transfer-in drive rollers 21, 21 are driven at a speed higher than that of the main drive rollers 22, 22, when one pallet P located at the terminal end of the second traverser $T_2$ is to be moved to the start end of the first conveyer $C_1$ to catch up with the final pallet P on the first conveyer $C_1$.

A loaded tray transfer-in station $S_3$ is provided at the start end of the second conveyer $C_2$ for supplying the part tray 18 on which the parts $p_1$ to $p_4$ to be assembled to the doors $D_L$ and $D_R$ placed on the pallet P have been set.

Figure 3:
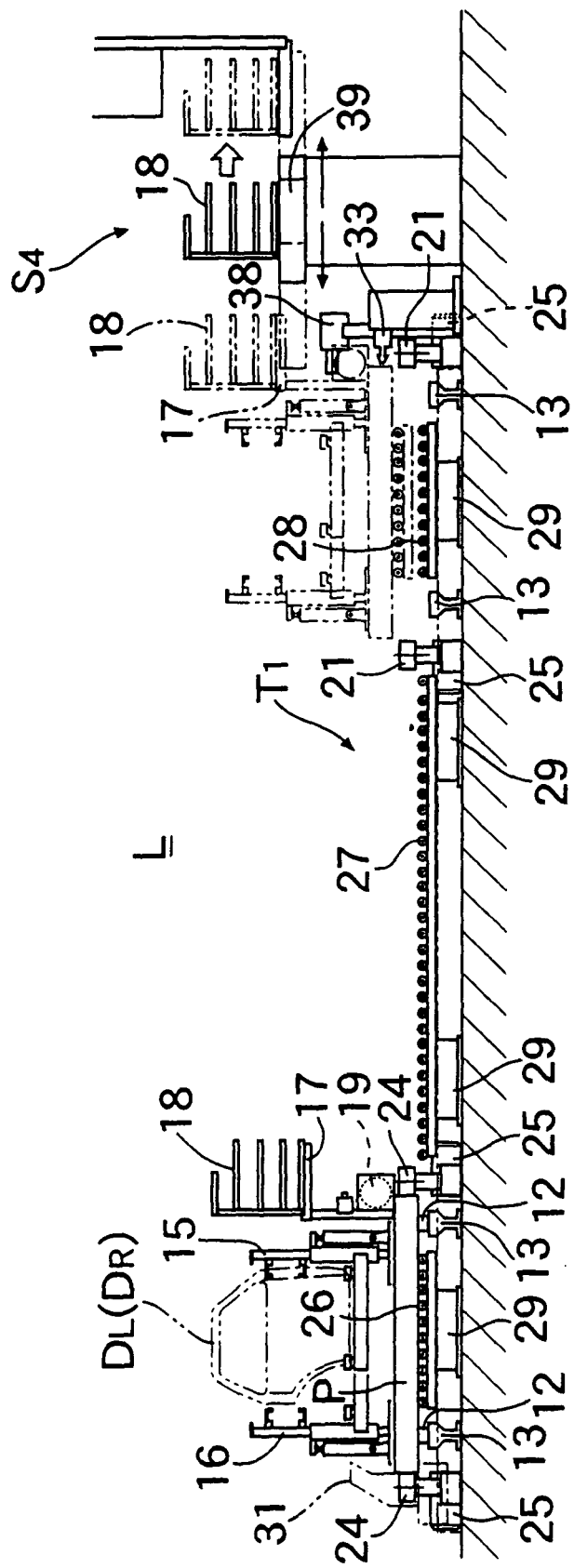

The structures of the first and second traversers $T_1$ and $T_2$ will be described below with reference to FIGS. 1, 3 and 4. The first and second traversers $T_1$ and $T_2$ are disposed point-symmetrically with respect to the center of the transfer system and have substantially the same structure and hence, the structure of the first traverser $T_1$ will be described below as a representative.

The first traverser $T_1$ has three roller conveyers 26, 27 and 28 capable of supporting the lower surface of the pallet P. The roller conveyers 26, 27 and 28 are disposed in line from the terminal end of the first conveyer $C_1$ toward the start end of the second conveyer $C_2$. Each of the roller conveyers 26, 27 and 28 is capable of being lifted and lowered synchronously by cylinders 29, and the level of the transfer surface thereof in a lifted position is higher than the level of the lower surface of the pallet P on the first and second conveyers $C_1$ and $C_2$, while the level of the transfer surface thereof in a lowered position is lower than the level of the lower surface of the pallet P on the first and second conveyers $C_1$ and $C_2$.

Each roller of the roller conveyers 26, 27 and 28 is a free roller having no drive source, and the movement of the pallet P is carried out by a rodless cylinder 30 disposed along one side of the first traverser $T_1$. An output member 31 reciprocally movable along the rodless cylinder 30 is capable of being righted up and tilted down. The righted-up output member 31 is engaged with one of short sides of the pallet P, and the tilted-down output member 31 is retreated downwards, so that it does not interfere with the pallet P.

Two stoppers 32, 32 are provided at the start end of the first traverser $T_1$ and capable of abutting against the front short side of the pallet P in an advancing direction of the pallet P to stop the pallet P moved from the first conveyer $C_1$ to the start end of the first traverser $T_1$. Two stoppers 33, 33 are provided at the terminal end of the first traverser $T_1$ and capable of abutting against the front long side of the pallet P in the advancing direction of the pallet P to stop the pallet P moved from the start end of the first traverser $T_1$ to the terminal thereof. Provided at one side of the first traverser $T_1$ are two guide rollers 34, 34 for guiding the right short side of the pallet P in the advancing direction, and a single guide rail 35.

A rodless cylinder 36 is mounted between the terminal end of the first traverser $T_1$ and the start end of the second conveyer $C_2$, and an output member 37 reciprocally movable along the rodless cylinder 36 is capable of being righted up and tilted down between a position in which it engages the lower surface of the pallet P and a position in which it does not interfere with the lower surface of the pallet P.

An empty-tray transfer-out station $S_4$ for discharging the empty part tray 18 from the pallet P is provided at the terminal end of the first traverser $T_1$. An air supply means 38 is provided in the empty-tray transfer-out station $S_4$ and connected to the coupling 20 mounted on the pallet P for supplying air.

The operation of the embodiment of the present invention having the above-described arrangement will be described below.

When empty one of the plurality of pallets P moved on the first conveyer $C_1$ at a low speed, which is first in the advancing direction, is passed through the work transfer-in station $S_1$, a pair of left and right doors $D_L$ and $D_R$ are transported to the door support jigs 15 and 16 of such empty pallet P by the transporting device $B_1$. At this time, the plurality of pallets P are connected together in close contact with one another on the first conveyer $C_1$, and the pallet P lying at the terminal end of the second traverser $T_2$ is in succession behind a pallet $P_1$ in the advancing direction, which lies at the end of the plurality of pallets P in the advancing direction (namely, behind the pallet P lying at the start end of the first conveyer $C_1$).

When the pallet P having the doors $D_L$ and $D_R$ transported thereto in the work transfer-in station $S_1$ reaches the position at the transfer-out drive rollers 24, 24 which are being rotated at a high speed, such pallet P is separated from the succeeding pallet P and moved to the start end of the first traverser $T_1$. At this time, the three roller conveyers 26, 27 and 28 of the first traverser $T_1$ are in their lowered positions and hence, the roller conveyer 26 laying between the two rails 13, 13 of the first conveyer $C_1$ and the pallet P cannot interfere with each other. The pallet P which has newly reached the work transfer-in station $S_1$ of the first conveyer $C_1$ is braked by contact with the brake rollers 23, 23 generating the braking force and thus, is prevented from overrunning to the start end of the first traverser $T_1$. The leading pallet P in the advancing direction on the second conveyer $C_2$ is separated from the succeeding pallet P in parallel with the operation of the first conveyer $C_1$ and is moved to the start end of the second traverser $T_2$.

Now, when the pallet P moved from the terminal end of the first conveyer $C_1$ to the start end of the first traverser $T_1$ is put into abutment against the stoppers 32, 32 and thus stopped, the cylinders 29 are expanded to lift the three roller conveyers 26, 27 and 28 synchronously, whereby the pallet P is lifted by the roller conveyer 26 on the side of the start end (see FIG. 8A). Then, when the output member 31 is righted up to engage one of the long sides of the pallet P, the pallet P pushed by the output member 31 driven by the rodless cylinder 30 is moved on the roller conveyers 26, 27 and 28 and put into abutment against the stoppers 33, 33 at the terminal end of the first traverser $T_1$ and thus stopper (see FIG. 8B). At this time, there is no possibility that the pallet P may interfere with the rails 13 of the first and second conveyers $C_1$ and $C_2$, because the roller conveyers 26, 27 and 28 are in their lifted positions.

When the pallet P has reached the terminal end of the first traverser $T_1$, the cylinders 29 are contracted to lower the roller conveyers 26, 27 and 28, whereby the pallet P carried on the roller conveyer 28 is transported onto the rails 13, 13 of the second conveyer $C_2$. When the pallet P is moved from the start end to the terminal end of the first traverser $T_1$ in the above manner, the pallet P is moved in a similar action from the start end to the terminal end of the first traverser $T_1$ in parallel with the above-described movement.

In this manner, the roller conveyers 26, 27 and 28 of the first and second traversers $T_1$ and $T_2$ are lifted and lowered to deliver the pallets P between the first and second conveyers $C_1$ and $C_2$. Therefore, it is possible to prevent the pallets P from interfering with the first and second conveyers $C_1$ and $C_2$ to smoothly transport the pallets P between the first and second conveyers $C_1$ and $C_2$ and the first and second traversers $T_1$ and $T_2$. The central roller conveyer 27 need not be necessarily lifted and lowered, and may be fixed in the lifted position.

The empty-tray transfer-out station $S_4$ is provided at the terminal end of the first traverser $T_1$, and the empty part tray 18 supported on the tray support 17 on the pallet P is removed and discharged to the empty-tray transfer-out station $S_4$ by an automatic discharge conveyer 39. At the same time, the air supply means 38 provided in the empty-tray transfer-out station $S_4$ is connected to the coupling 20 of the pallet P, and air is filled into the air tank 19.

Since the air tank 19 is mounted on the pallet P, as described above, the handling of the air hose can be simplified, as compared with a case where air is supplied from the outside of the pallet P. Moreover, even if the pallet P is moved, the same air tool T can be used continuously, leading to an enhanced operability. Further, air can be supplied to the air tank 19, while the pallet P is being circulated along the transfer line L, and hence, it is extremely easy to supply air to the air tank 19.

Then, the pallet P at the terminal end of the first traverser $T_1$ is moved to the start end of the second conveyer $C_2$ by the transfer-in drive rollers 21, 21 and connected to the pallet P at the end of the plurality of pallets P moved at a low speed on the second conveyer $C_2$ in the advancing direction. At this time, the rodless cylinder 36 is operated to cause the output member 37 to urge the pallet P, thereby assisting in the operation of the transfer-in drive rollers 21, 21. In parallel with this, the pallet P at the terminal end of the second traverser $T_2$ is also moved on the first conveyer $C_1$ by the transfer-in drive rollers 21, 21 and the rodless cylinder 36 and is connected to the pallet P at the end of the plurality of pallets P moved at a low speed on the first conveyer $C_1$ in the advancing direction.

When the pallet P which has moved from the terminal end of the first traverser $T_1$ to the start end of the second conveyer $C_2$ is passed through the loaded tray transfer-in station $S_3$, the part tray 18, on which the parts $p_1$ to $p_5$ to be assembled to the doors $D_L$ and $D_R$ have been set, is placed on the tray support 17 of the pallet P by an automatic supply conveyer 44.

Two operators riding on the pallet P complete the operation of assembling the parts $p_1$ to $p_5$ on the part tray 18 to the doors $D_L$ and $D_R$ within a period of movement of the pallet P from the first conveyer $C_1$ via the second traverser $T_2$ to the work transfer-out station $S_2$ of the first conveyer $C_1$. During this time, air for operating the air tool T such as the impact wrench is supplied from the air tank 19 mounted on the pallet P, and air for operating the air cylinders $15_1$ and $16_1$ for lifting the doors $D_L$ and $D_R$ to a level suitable for the operation is also supplied from the air tank 19. When the pallet P has reached the work transfer-out station $S_2$ of the first conveyer $C_1$, the doors $D_L$ and $D_R$ which have been assembled are discharged from the pallet P to the work transfer-out station $S_2$, thus finishing the process of one cycle.

By previously mounting the part tray 18, on which the parts $p_1$ to $p_5$ to be assembled to the doors $D_L$ and $D_R$ have been set, on the pallet P, it is unnecessary to conduct the sequential supplying of the parts to the pallet P which is being moved, leading to a remarkably enhanced operability.

As described above, the first and second conveyers $C_1$ and $C_2$ can collectively drive the plurality of pallets P connected in contact with one another forwards by driving the rearmost pallet P by the main drive rollers 22, 22. Therefore, if it is necessary to prolong the lengths of the first and second conveyers $C_1$ and $C_2$, only the lengths of the rails 13 of the first and second conveyers $C_1$ and $C_2$ may be prolonged, and it is unnecessary to provide any change to the main drive rollers 22, 22 and the other rollers 21, 21; 23, 23; and 24, 24. Therefore, it is extremely easy to modify the length of the transfer line L.

Most of the closed transfer line L for circulation of the pallets P are utilized for the operation of assembling the parts $p_1$ to $p_5$ and hence, a portion of the transfer line L required for only the returning of the empty pallets P is nearly eliminated, thereby providing an effective utilization of a space. On the contrast, in the prior art in which a return line for returning an empty pallet P is provided separately from an operating line for transferring a loaded pallet P having doors $D_L$ and $D_R$, a space in which the returning line is provided is useless. In a system in which a returning line is provided within a pit made by drilling a floor surface in order to avoid the uselessness of a space, there is a problem that the making of the pit by drilling becomes of a large scale and hence, the working cost is increased remarkably. With the transfer system according to the present invention, however, it is extremely easy to change the length of the transfer line L, and also an assembling line having a high operability can be constructed at a minimum space and a minimum equipment cost.

Further, a working space $W_0$ is provided inside the transfer line L surrounded by the first and second conveyers $C_1$ and $C_2$ and the first and second traversers $T_1$ and $T_2$ (see FIGS. 1 and 2), and hence, it is possible for the operator to easily access any of the pallets P on the transfer line L through the working space $W_0$, leading to a further enhanced operability.

In the above-described transfer lines L, for convenience, the work transfer-in stations $S_1$ and the work transfer-out stations $S_2$ are disposed on the side of the first conveyers $C_1$; the loaded tray transfer-in station $S_3$ is disposed at the start end of the second conveyers $C_2$; the empty-tray transfer-out station $S_4$ is disposed at the terminal end of the first traversers $T_1$. However, the locations of the station $S_1$ to $S_4$ may be changed as desired.

Figure 9:
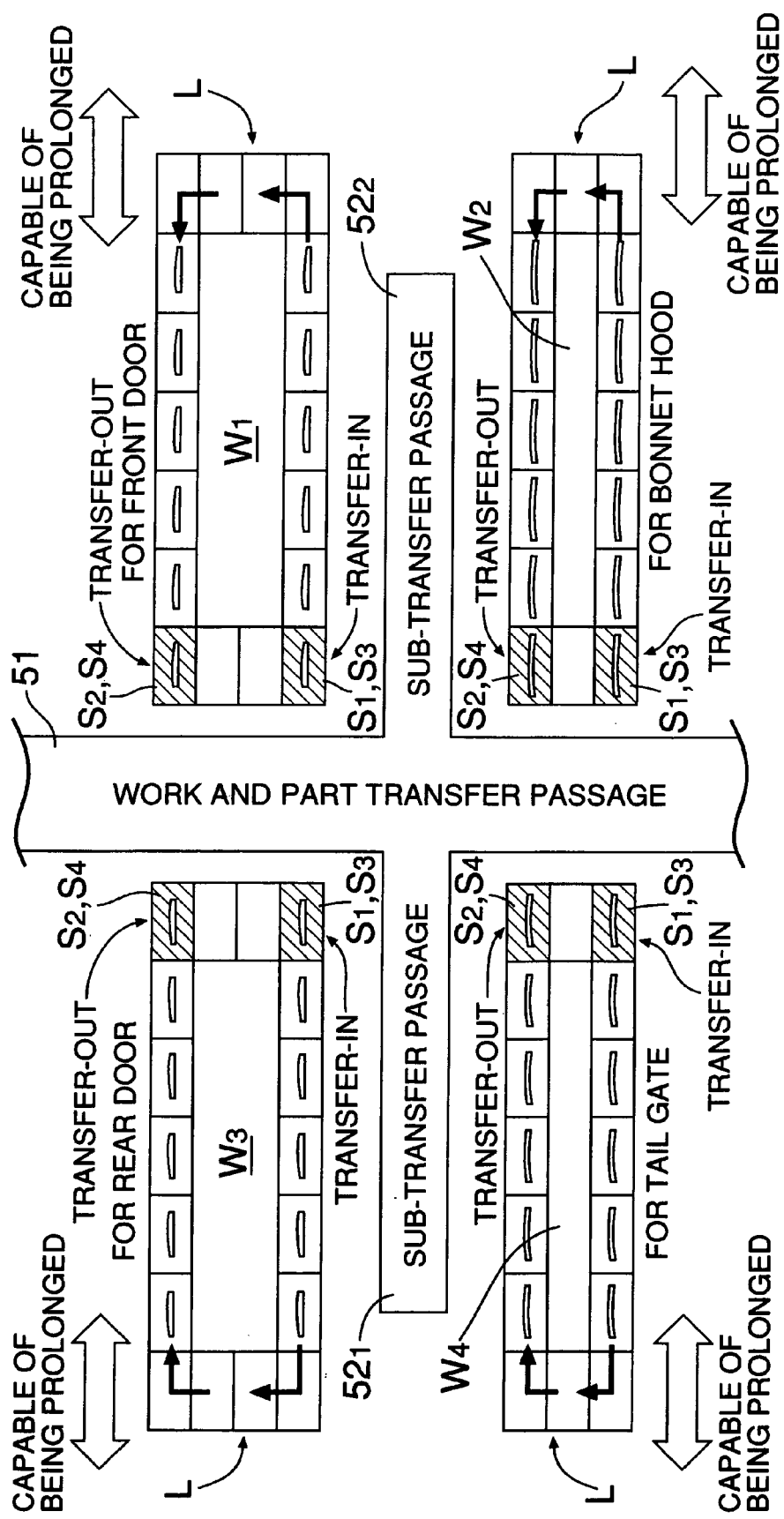

As shown in FIG. 9, four transfer lines L are disposed in a distributed manner on opposite left and right sides of a work and part transfer passage 51 extending vertically through the center. The left upper transfer line L is used for assembling rear doors; the left lower transfer line L is used for assembling a tail gate; the right upper transfer line L is used for assembling front doors; and the right lower transfer line L is used for assembling a bonnet hood. The transfer line L for assembling rear doors and the transfer line L for assembling front doors are disposed along one longitudinal side of sub-transfer-passages $52_1$ and $52_2$ which branch out from opposite sides of the work and part transfer passage 51, and the transfer line L for assembling a tail gate and the transfer line L for assembling a bonnet hood are disposed along the other longitudinal side of the sub-transfer-passages $52_1$ and $52_2$. The work transfer-in stations $S_1$ and the loaded tray transfer-in station $S_3$ as well as the work transfer-out stations $S_2$ and the empty-tray transfer-out station $S_4$ are disposed at the ends, facing the work and part transfer passage 51, of each of the transfer lines L.

As described above, the longitudinal ends of the plurality of the transfer lines L face the work and part transfer passage 51, and the transfer-in stations $S_1$ and $S_3$ as well as the transfer-out stations $S_2$ and $S_4$ are disposed at the longitudinal ends of each of the transfer lines L. Therefore, the plurality of the transfer lines L can be arranged in a required minimum space, while facilitating the supply and discharge of the works and parts with respect to the plurality of the transfer lines L.

Particularly, since the pair of the right and left transfer lines L (the transfers line L for assembling rear doors and the transfers line L for assembling front doors, or the transfer line L for assembling a tail gate and the transfers line L for assembling a bonnet hood) are deposed in line in right and left directions, the right and left transfer lines L can be compactly disposed in a narrow long space. Also, since the four transfer lines L are disposed in four directions from the intersection point of the work and part transfer passage 51, the sub-transfer-passages $52_1$ and $52_2$, it is possible to achieve a further space reduction. Moreover, since the sub-transfer-passages $52_1$ and $52_2$ branch out from the work and part transfer passage 51 and extend in the longitudinal direction along all the transfer lines L, it is possible to easily supply the parts to the intermediate portions of the transfer lines L.

Further, the transfer direction is the clockwise in the transfer lines L for assembling rear doors and a tail gate on the right side of the work and part transfer passage 51, and the transfer direction is the counterclockwise in the transfer lines L for assembling front doors and a bonnet hood on the left side of the work and part transfer passage 51. Therefore, in the transfer line L for assembling rear doors and the transfer line L for assembling front doors which oppose to each other with the work and part transfer passage 51 therebetween, the transfer-in stations $S_1$ and $S_3$ of one transfer line L oppose to the same of the other transfer line L, and the transfer-out stations $S_2$ and $S_4$ of one transfer line L oppose to the same of the other transfer line L. As a result, the transfer-in and transfer-out operations of the works and parts can be smoothly performed, as compared with the case where the transfer-in stations $S_1$ and $S_3$ face the transfer-out stations $S_2$ and $S_4$. This advantage is also provided by the layout of the transfer lines L for assembling a tail gate and the transfer lines L for assembling a bonnet hood which oppose to each other with the work and part transfer passage 51 therebetween.

As described above, the employment of this layout ensures that the work and part transfer passage 51 can commonly be used by the four transfer lines L and a space can be utilized further effectively, and also the length of the transfer lines L can be increased or decreased as required. Therefore, it is possible to easily accommodate to the change in type of the system or the like. If each of the transfer-in stations $S_1$ and $S_3$ and the transfer-out stations $S_2$ and $S_4$ is formed of a lifter, and works and parts are transferred in and out through an overhead conveyer, the area for the transfer lines L can be reduced. Further, since the working spaces $W_1$ to $W_4$ are provided inside the four transfer lines L, an operator can easily access any of the pallets P through the working spaces $W_1$ to $W_4$, leading to a further enhanced operability.

Although the embodiments of the present invention have been described in detail, it will be understood that the present invention is not limited to the above-described embodiments, and various modifications in design may be made without departing from the spirit and scope of the invention defined in the claims.

For example, in the present embodiments, the plurality of the transfer lines L are disposed on opposite sides of the work and part transfer passage 51, however, they may be disposed on one side of the work and part transfer passage 51.

Also, the present invention is applicable to a line for assembling any works other than a door, a tail gate and a bonnet hood of an automobile.

INDUSTRIAL APPLICABILITY

As described above, such transfer system according to the present invention is useful for carrying out the operation of assembling parts to any work on the pallet of the conveyer, and particularly, is suitably applicable to a sub-line for assembling sub-assemblies for a four-wheel or two-wheel vehicle.

The invention claimed is:

1. A transfer system comprising:
a plurality of transfer lines, each transfer line forming a closed loop and having transfer-in stations and transfer-out stations for assembling parts to a work, while circulating the work along the transfer line;
a work and part transfer passage for transferring the work and the parts; and
sub-transfer-passages branching out from the work and part transfer passage;
wherein the work and part transfer passage completely separates the plurality of transfer lines into first and second groups of transfer lines, wherein longitudinal ends of each transfer line faces a side of the work and part transfer passage;
wherein the transfer-in stations and the transfer-out stations are disposed at each of the longitudinal ends of each of the transfer lines; and
wherein the sub-transfer-passages completely separate the plurality of transfer lines into third and fourth groups of transfer lines, which are different from the first and second groups of transfer lines and wherein the sub-transfer-passages are disposed on longitudinally sides of the transfer lines.

2. A transfer system according to claim 1, wherein longitudinal ends of a pair of the transfer lines face opposite sides of the work and part transfer passage.

3. A transfer system according to claim 2, wherein transfer directions of the pair of the transfer lines disposed on the opposite sides of the work and part transfer passage are reverse to each other; the transfer-in stations of one transfer line oppose to the same of the other transfer line, with the work and part transfer passage therebetween; and the transfer-out stations of one transfer line oppose to the same of the other transfer line, with the work and part transfer passage therebetween.

4. A transfer system according to claim 1, wherein a pair of the transfer lines are disposed along one side of the sub-transfer-passages, and another pair of the transfer lines are disposed along the other side of the sub-transfer-passages.

* * * * *